United States Patent
Ohkawa

(10) Patent No.: US 6,746,129 B2
(45) Date of Patent: Jun. 8, 2004

(54) LIGHT GUIDE PLATE, SURFACE LIGHT SOURCE DEVICE AND DISPLAY

(75) Inventor: Shingo Ohkawa, Koshigaya (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/925,012

(22) Filed: Aug. 9, 2001

(65) Prior Publication Data

US 2002/0054488 A1 May 9, 2002

(30) Foreign Application Priority Data

Aug. 11, 2000 (JP) ........................................ 2000-243757
Aug. 2, 2001 (JP) ........................................ 2001-235414

(51) Int. Cl.⁷ ................................................ F21V 7/04
(52) U.S. Cl. .......................... 362/31; 362/27; 362/331; 362/332; 362/339; 349/65; 385/901
(58) Field of Search .................... 362/31, 343, 560, 362/297, 561, 26, 27, 330, 331, 332, 339, 348; 359/599; 385/901; 349/64, 65

(56) References Cited

U.S. PATENT DOCUMENTS

| | | | | |
|---|---|---|---|---|
| 5,128,842 A | * | 7/1992 | Kenmochi | 362/95 |
| 5,727,862 A | * | 3/1998 | Wu | 362/27 |
| 5,803,573 A | * | 9/1998 | Osawa et al. | 362/31 |
| 5,961,198 A | * | 10/1999 | Hira et al. | 362/31 |
| 6,065,845 A | * | 5/2000 | Miyazaki | 362/26 |
| 6,088,074 A | | 7/2000 | Suzuki | 349/62 |
| 6,330,386 B1 | | 12/2001 | Wagner et al. | 385/120 |

FOREIGN PATENT DOCUMENTS

| | | |
|---|---|---|
| CN | 259861 | 10/1995 |
| CN | 278142 | 6/1996 |
| CN | 284853 | 9/1996 |
| CN | 324791 | 1/1998 |
| EP | 0878720 A1 | 11/1998 |
| EP | 1 072 907 A1 | 1/2001 |
| JP | 05-127157 | 5/1993 |
| JP | 9-269489 | 10/1997 |
| WO | WO 98/27382 | 6/1998 |
| WO | WO 00/49432 | 8/2000 |

OTHER PUBLICATIONS

U.S. patent application Ser. No. 09/647,760, Ohkawa et al., filed Oct. 5, 2000.

* cited by examiner

Primary Examiner—Sandra O'Shea
Assistant Examiner—Ali Alavi
(74) Attorney, Agent, or Firm—Staas & Halsey LLP

(57) ABSTRACT

A surface light source device and display utilize a light guide plate provided with micro-reflectors arranged in an orientation suitable for a plurality of input portions having point-like light emitters, respectively. A light guide plate 15 has a back face divided into areas ARA to ARC to each of which each input portion having each of LEDs 14A to 14C is shared. Micro-reflectors 19 in each of areas ARA to ARC are orientated as to be directed to each of LEDs 14A to 14C correspondingly, effecting an effective direction conversion. Emitted light is incident to a liquid crystal display panel generally at a right angle via a light diffusion sheet. Some micro-reflectors 19 in each of areas ARA to ARC may be arranged as to be directed to an adjacent input portion. Micro-reflectors may be shaped like quadrangle pyramid projections, cylindrical dents or V-shaped dents.

12 Claims, 10 Drawing Sheets

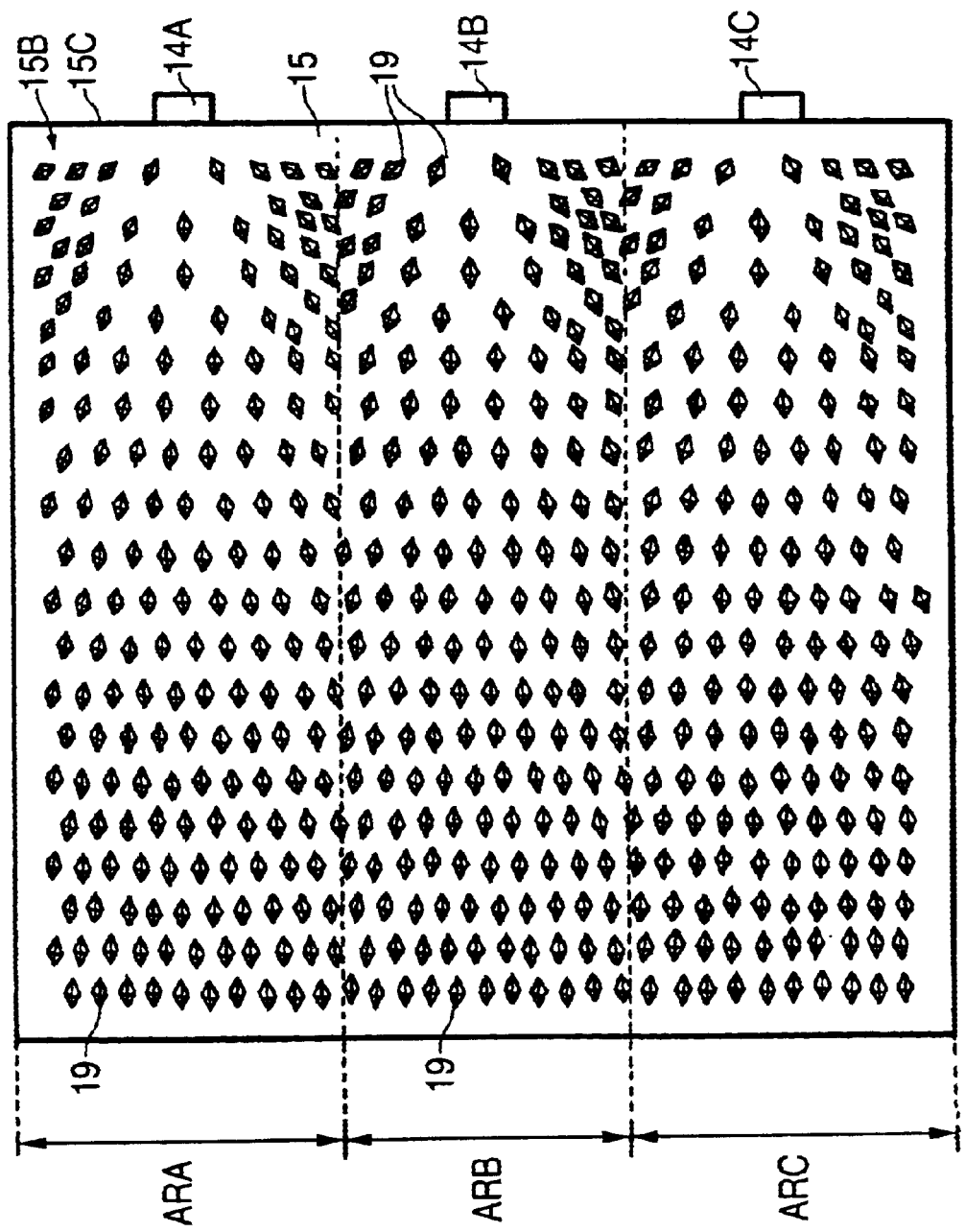

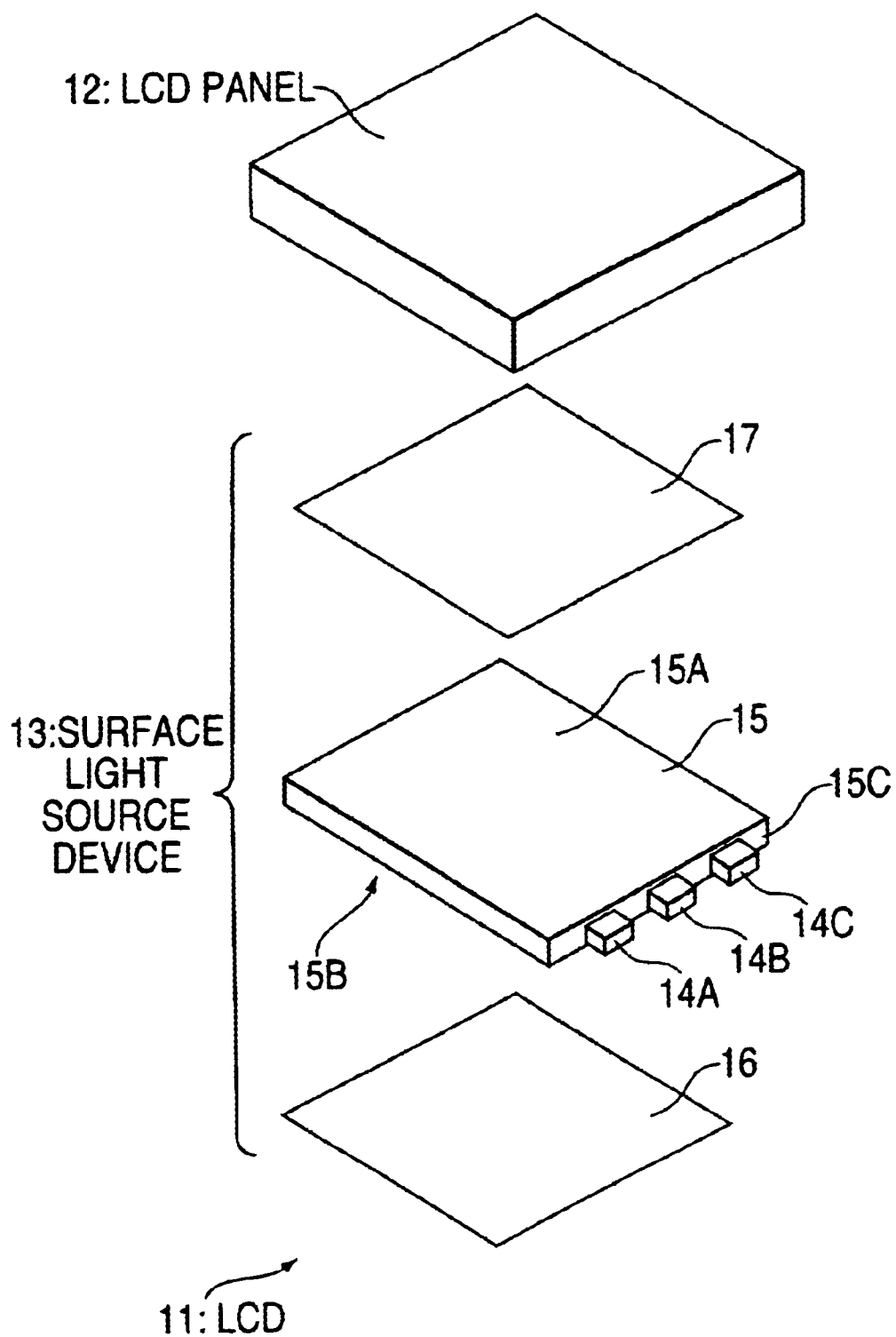

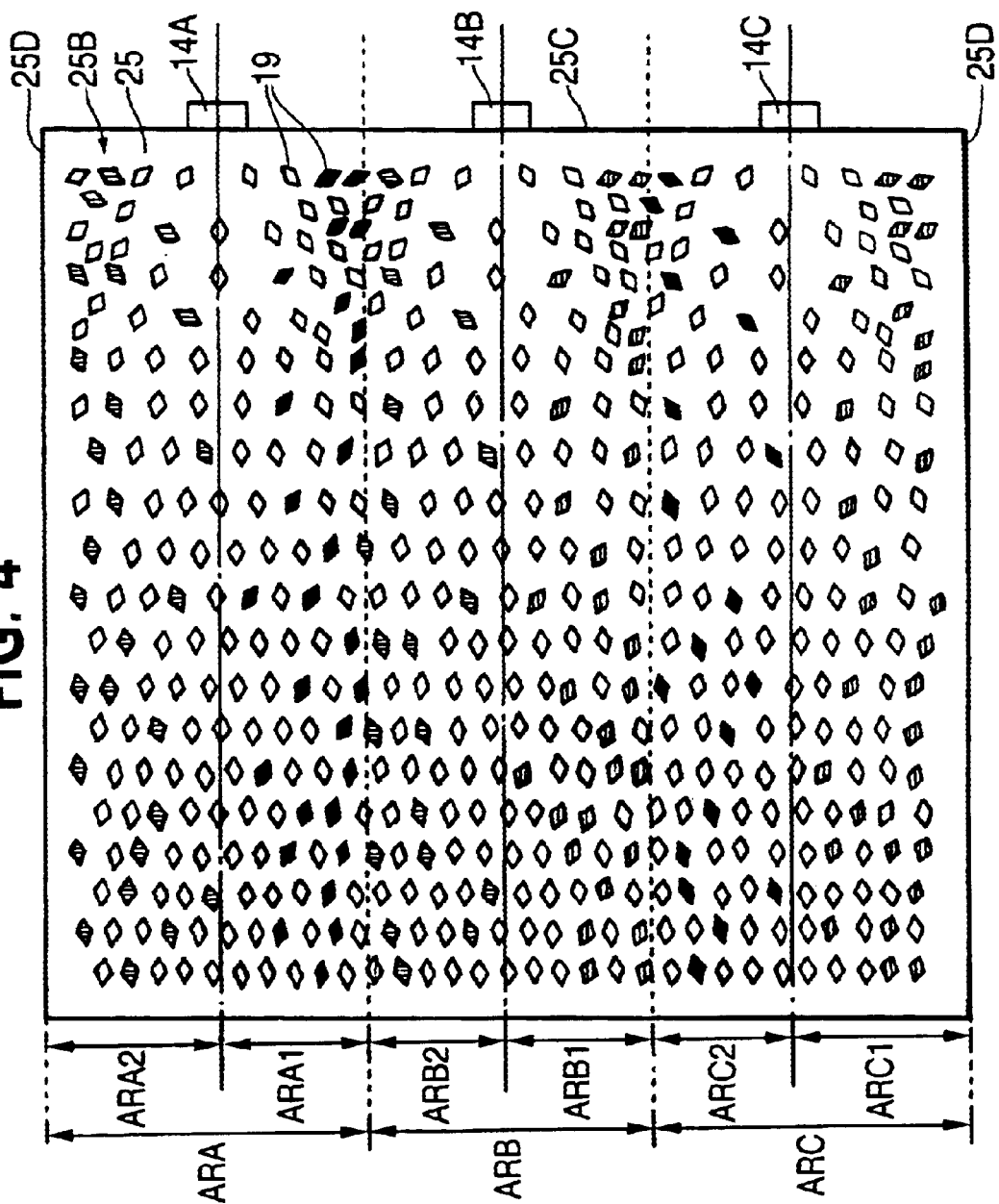

FIG. 9a
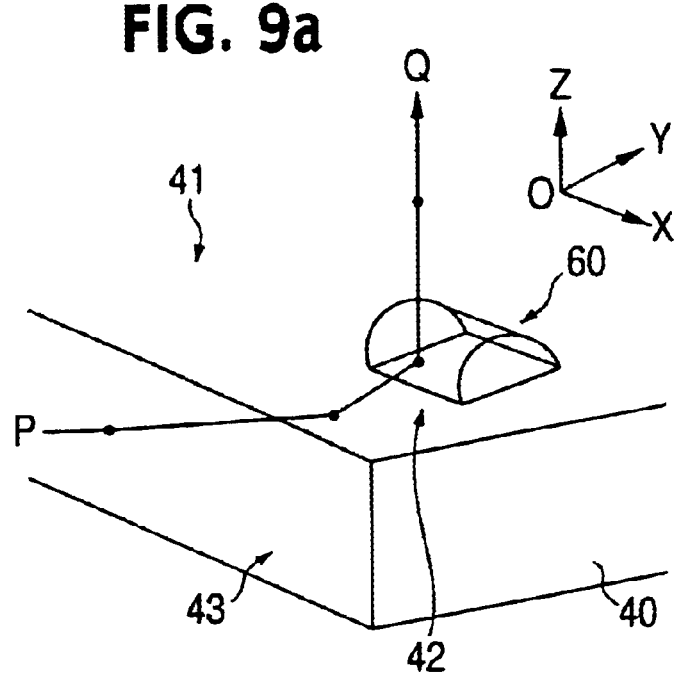
FIG. 9b
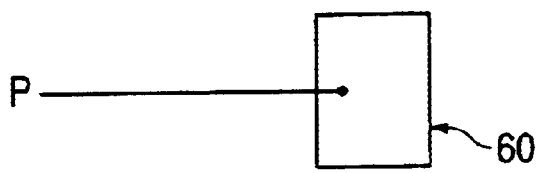
FIG. 9c
FIG. 9d
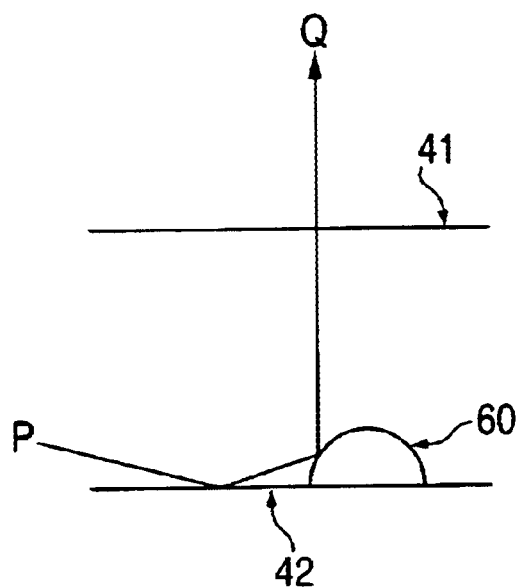
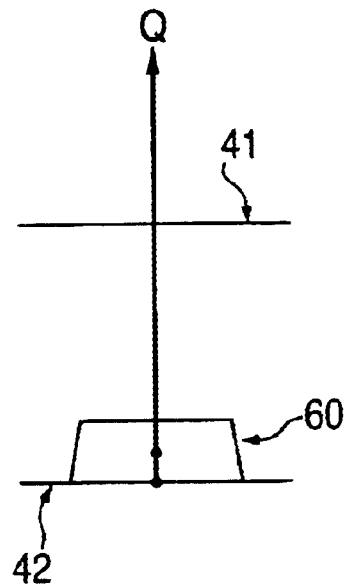

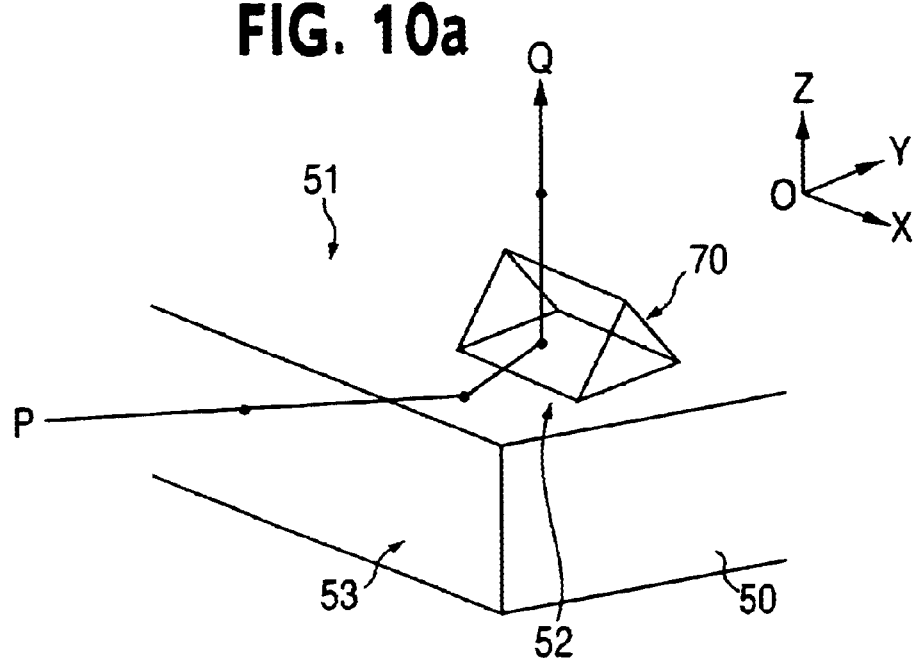
FIG. 10a
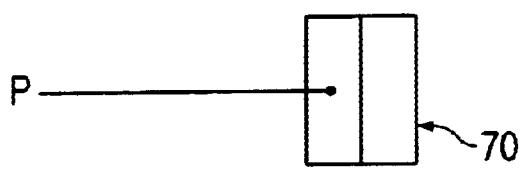
FIG. 10b
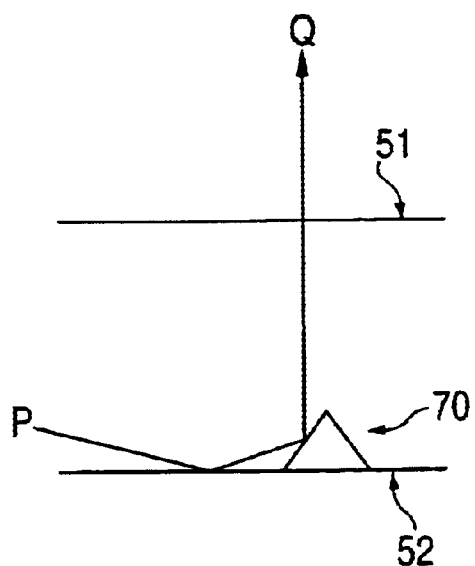
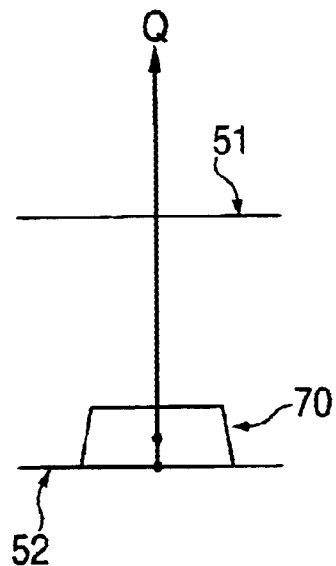
FIG. 10c  FIG. 10d

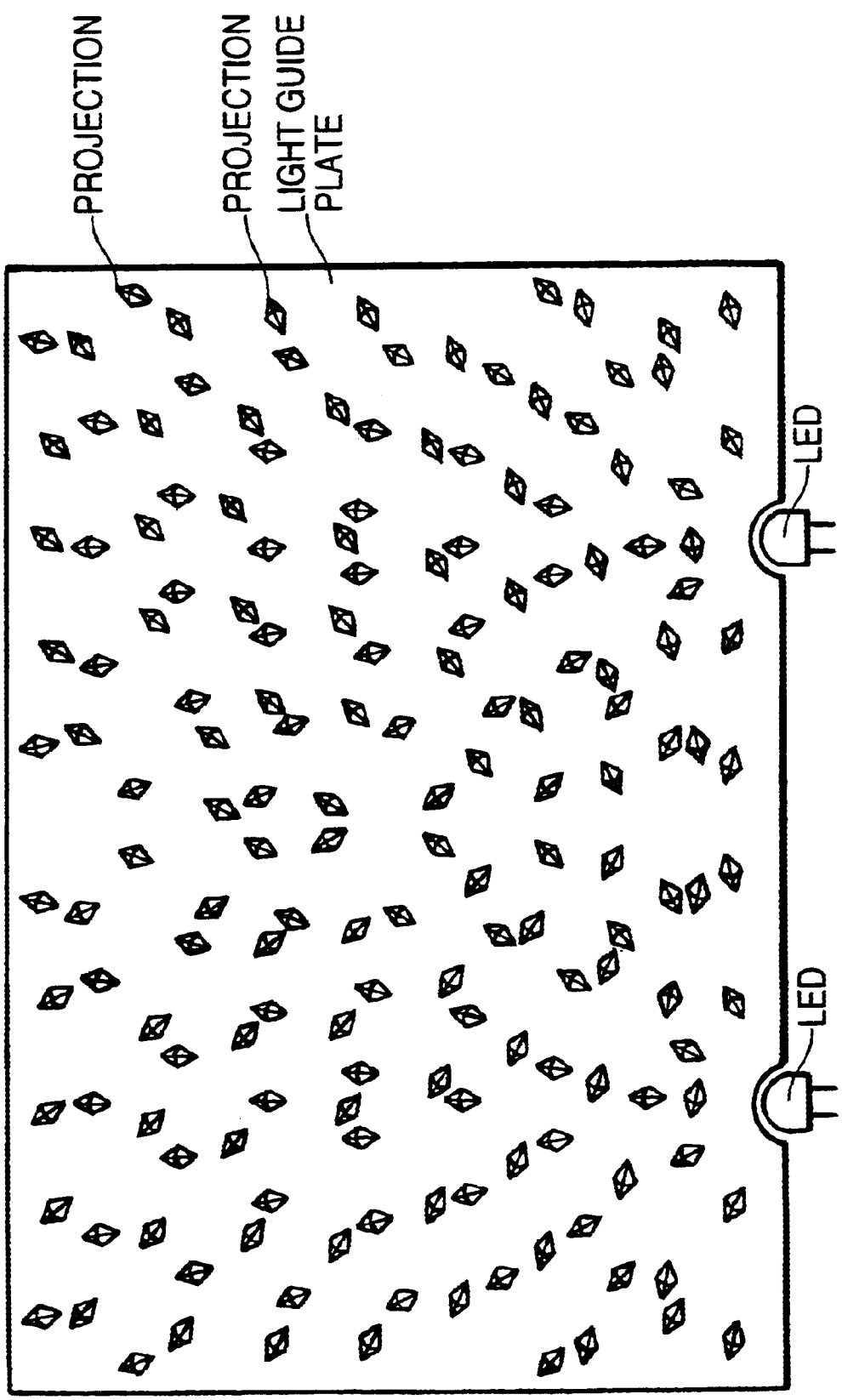

LIGHT GUIDE PLATE, SURFACE LIGHT SOURCE DEVICE AND DISPLAY

BACKGROUND

1. Field of Invention

The present invention relates to a light guide plate emitting light from an emission face after applying direction-conversion within the light guide plate to light supplied thereto sideways, and to a surface light source device and display employing the light guide plate.

2. Related Art

A well-known technique gives a surface light source device that employs a light guide plate having a side part for light introduction and an emission face provided by one of two major faces (i.e. faces larger than end faces), the surface light source device being applied to various uses such as back-lighting for a liquid crystal display. A surface light source device of such a type has a basic performance greatly depending on a light guide plate employed therein.

A basic function of a light guide plate is to change a propagation direction (roughly in parallel with an emission face of the light guide plate) of light introduced into the light guide plate through a side end face so that the light is emitted through the emission face. As known well, a simply transparent light guide plate without any modification is capable of deflecting light little, providing a unsatisfactory brightness.

Therefore any means for promoting emission through the emission face is required. The means is preferably capable of providing a sufficient illumination output directed to a desired direction (usually, a generally frontal direction) without a particular need of light propagation direction modifying member (such as prism sheet).

It is noted that a light propagation direction modifying member, typically a prism sheet, is used often, as known well, in order to modify a greatly forward-inclined direction of an emission from an emission face and to obtain an illumination output directed to a desired direction (usually, a generally frontal direction).

Under such background, the present inventor has proposed a light guide plate provided with so-called micro-reflectors and surface light source device/LCD employing the light guide plate, being disclosed in Japanese Patent Application Tokugan-Hei 11-38977 and PCT/JP00-00871 (WO00-49132).

According to this proposed prior art, a light guide plate has a back face provided with a great number of micro-reflectors. FIG. 11 exemplarily shows one of them to illustrates an emission promotion effect. As shown in FIG. 11, each micro-reflector has first and second reflection surfaces (called inner-reflection surfaces, hereafter) which provide a pair of inclined reflection surfaces forming a valley inside.

Upon reaching a micro-reflector and entering into a valley thereof on the way of propagation within the light guide plate, light is direction-converted mainly by inner-reflections effected twice. Such double inner reflections consist of one inner reflection effected at one of the first and second reflection surfaces and the other inner reflection effected at the other of the first and second reflection surfaces.

This direction conversion produces a light directed to the emission face, promoting omission from the emission face. A propagation direction of light after being direction-converted by each micro-reflector mainly depends on inclinations (i.e. spatial directions) of the first and second reflection surfaces of the micro reflector. Therefore angular emission characteristics of the light guide plate as a whole can be controlled within a remarkable range by means of adjusting factors such as direction distribution of reflection surfaces, or arraying pattern or distribution of the micro reflectors.

According to typical designs, it is aimed that a light guide plate allows an emission face of the light guide plate to emit the most intensive light toward a generally frontal direction. Employable primary light sources for supplying light to a light guide plate include a line-like light source such as cold cathode lamp and point-like light source such as light emitting diode, both being usable for providing a surface light source device to have an improved brightness.

However, a problem arises if the above-proposed prior art is applied to a case where a plurality of point-like light sources are adopted as primary light source, a problem arises. The problem is simply described with referring to FIG. 12. FIG. 12 illustrating an example of arrangement employing a plurality of point-like light sources as proposed in the above prior art.

This arrangement comprises point-like light sources (light emitting diodes) disposed in dents (input portions), which are located at two positions on one side, and a great number of micro-reflector formed on a back face. Each micro-reflector is shaped as shown in FIG. 11 and has an orientation represented by a ridge formed by first and second reflection surfaces meeting each other. The orientation in this arrangement is as follows.

About half of all of the micro-reflectors have ridges orientated as to directed to one of the point-like light sources (input portions). It is noted that such "about half of all the micro-reflectors" are distributed all over the back face. On the other hand, the other about half of all of the micro-reflectors have ridges orientated as to directed to the other of the point-like light sources (input portions) It is noted that such "the other about half of all of the micro-reflectors" are also distributed all over the back face.

Therefore, some areas have micro-reflectors provided with very irrational orientations. For example, although some micro-reflectors are much nearer to "one point-like light source" than to "the point-like light source", many of them are focused to "the other point-like light source", with the result that said many micro-reflectors receive a strong light sideways. This brings an inefficient direction-conversion and a direction-conversion into an undesirable direction, possibly affecting emission of inner propagation light.

OBJECT AND SUMMARY OF INVENTION

An object of the present invention is to provide at light guide plate suitable for introducing light from a plurality of input portions using point-like light sources, a surface light source device and a display employing the light guide plate. Viewing from another angle, the present invention aims to provide a light guide plate and a surface light source device which are capable of outputting an illumination light at a high efficiency and to realize a bright display by applying them to a display.

In the first place, the present invention is applied to a light guide plate having a plurality of input portions through which an illumination light emitted from a point-like light source is introduced and an emission face provided by a major face through which the illumination light introduced is emitted on the way of inner propagation.

According to an improvement provided by the present invention, the light guide plate has a back face opposite with the emission face and divided into a plurality of regions to each of which any of the input portions is allotted, each of the regions being provided with a great number of micro-reflectors for converting a direction of an inner propagation light into a direction toward the emission face by effecting an inner reflection. And the micro-reflectors located in each of the regions are orientated toward an input portion allotted to the each region.

This enables the micro-reflectors to have orientations determined in consideration for situation of each region provided by the above division. In other words, micro-reflector orientations can be determined, for each region, depending on which input portion should be aimed by micro-reflectors in each region. As a result, an efficient direction conversion into a desirable direction (typically, a generally frontal direction) is effected by the micro-reflectors.

A micro-reflector may be shaped like a quadrangle pyramid having a pair of inner-reflection slopes which meet each other as to provide a ridge representing an orientation of the micro-reflector. The ridge is directed toward the input portion allotted and gets closer to the back face with an increasing distance from the input portion allotted.

Alternatively, a micro-reflector may be shaped like a cylindrical concavity having an inner-reflection curved surface which represents an orientation of the micro-reflector. The inner-reflection curved surface is directed toward the input portion allotted. Further alternatively, a micro-reflector may be shaped like a V-shaped concavity having an inner-reflection slope which represents an orientation of the each micro-reflector. The inner-reflection slope is directed toward the input portion allotted.

According to another improvement provided by the present invention, the light guide plate has a back face opposite with the emission face and divided into a plurality of regions to each of which any of the input portions is allotted and each of the regions is provided with a great number of micro-reflectors. They include a first group of micro-reflectors orientated toward an input portion allotted to the each region and a second group of micro-reflectors which are intermingled with the first group of micro-reflectors and orientated toward another input portion allotted to different region adjacent to the each region.

And the second group of micro-reflectors have a covering rate the ratio of which to that of the first group of micro-reflectors gets greater with an decreasing distance from the adjacent region.

This enables the micro-reflectors to have orientations determined in consideration for not only situation of each region provided by the above division but also situation around boundaries among the respective regions. That is, a more efficient and uniform emission promotion is realized because of avoiding affection which could be caused by a sharp changing of orientation state around the boundaries among the respective regions.

A micro-reflector may be shaped like a quadrangle pyramid having a pair of inner-reflection slopes which meet each other as to provide a ridge representing an orientation of the micro-reflector. Each ridge of each of the first group of micro-reflectors is directed toward the input portion allotted and gets closer to the back face with an increasing distance from the input portion allotted while each ridge of each of the second group of micro-reflectors is directed toward the another input portion and gets closer to the back face with an increasing distance from the another input portion.

Alternatively, a micro-reflector may be shaped like a cylindrical concavity having an inner-reflection curved surface which represents an orientation of the each micro-reflector. Each inner-reflection curved surface of each of the first group of micro-reflectors is directed toward the input portion allotted while each inner-reflection curved surface of each of the second group of micro-reflectors is directed toward the another input portion.

Further alternatively, a micro-reflector may be shaped like a V-shaped concavity having an inner-reflection slope which represents an orientation of the each micro-reflector. Each inner-reflection slope of each of the first group of micro-reflectors is directed toward the input portion allotted while each inner reflection slope of each of the second group of micro-reflectors is directed toward the another input portion In the next place, the present invention is applied to a surface light source device comprising a light guide plate and point like light sources arranged corresponding to input portions of the light guide plate respectively. Further the present invention is applied to a display having a liquid crystal display panel and a surface light source device for illuminating the liquid crystal display panel. According to features of the present invention, the light guide plate is improved according to any of the above improvements. Needless to say, merits of such an improved light guide plate is maintained in the surface light source device and display.

That is, without a particular need of light propagation direction modifying member such as prism sheet, the surface light source device is capable of providing a sufficient illumination output directed to a desired direction (usually, a generally frontal direction and the display can have a liquid crystal display panel illuminated efficiently by the surface light source device.

BRIEF DESCRIPTION OF DRAWINGS

FIG. 1 is a plan view illustrating a light guide plate employed in a surface light source device applied to a liquid crystal display of a first embodiment in accordance with the present invention;

FIG. 2 is an exploded perspective view of the liquid crystal display of the first embodiment;

FIG. 4 is a plan view illustrating a light guide plate employed in a surface light source device applied to a liquid crystal display of a second embodiment in accordance with the present invention;

FIGS. 9a to 9d illustrate a direction-conversion which is applied to an inner propagation light and is effected by a micro reflector taken out from micro-reflectors shaped like cylindrical concaves formed on a modified light guide plate, wherein FIG. 9a shows a perspective view and FIGS. 9b, 9c and 9d show a light path from +Z-direction, from +X-direction and from Y-direction;

FIGS. 10a to 10d illustrate a direction-conversion which is applied to an inner propagation light and is effected by a micro-reflector taken out from micro-reflectors shaped like V-shaped concaves formed on a modified light guide plate, wherein FIG. 9a shows a perspective view and FIGS. 9b, 9c and 9d show a light path from +Z-direction, from +X-direction and from Y-direction;

FIG. 12 is a plan view illustrating an example of arrangement employing a plurality of point-like light sources as proposed in Japanese Patent Application Tokugan-Hei 11-38977.

EMBODIMENT

Figure 3A:
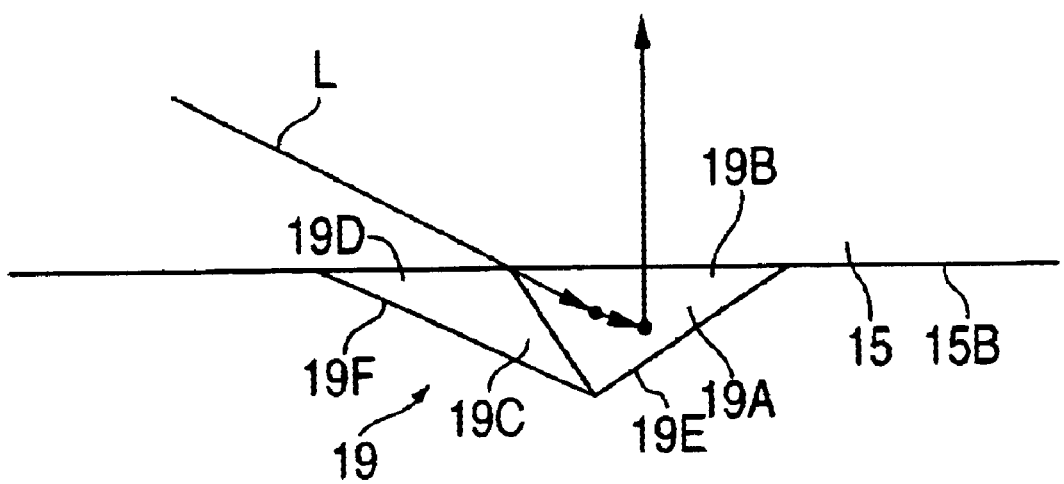
FIG. 3a and FIG. 3b are a side view and plan view of a micro-reflector formed on a back face of the light guide plate shown in FIG. 1, being accompanied with representative light paths, respectively.

Embodiments in accordance with the present invention are described below in detail with referring to the drawings. It is noted that some parts are exaggerated as required for giving easy understanding in the drawings.

(1) First Embodiment

FIG. 2 is an exploded perspective view of the liquid crystal display of the first embodiment. A liquid crystal display 11 which is applied, for example, to a portable telephone, has a liquid crystal display panel 12 illuminated by a back-lighting surface light source device 18. The light source device 18 has a light guide plate 15. The light guide plate 15 is provided input portions at three locations along one end face and light emitting diodes as point-like light sources 14A, 14B and 14C are disposed at each of the input portions.

The light guide plate 15 have major faces one of which provides an emission face 15D along which a light diffusion sheet 17 is disposed. A reflection sheet 16 is disposed along a back face 15B opposite with emission face 15A. The reflection sheet 17 is made of a white sheet member, reflecting and returning a leaking light once escaping through the back face 15B into the light guide plate 15, thereby avoiding loss of illumination light.

The light diffusion sheet 17 is made of a light permeable shoot which scatters weakly the illumination light emitted from the omission face 15A. Such a weak scattering makes fine elements such as micro reflectors described later inconspicuous and also makes an abnormal omission, even if it is caused by flaws or the like in the light guide plate 15, inconspicuous. Further to this, the light diffusion sheet 17 has a function to relax a fine-unevenness in brightness and to prevent the emission face 15A from being flawed.

The light guide plate 15 is an transparent injection-molded plain-plate-like member made of transparent material such as acrylic resin (PMMA resin) or cycloolefinic polymer. An incidence face 15C is provided by an end face (side face), along which LEDs 14A, 14B and 14C are disposed at a designed pitch.

Each of the LEDs 14A, 14B and 14C emits light which is introduced into the light guide plate 15 through each input portion (a part of incidence face 15C) to become an inner propagation light.

The inner propagation light undergoes repeated inner-reflections at the emission face 15A and back face 15B, propagating as a whole as to be distant from the incidence face 15C. The back face 15B is provided with a great number of projection-like micro reflectors described in detail later. A remarkable part of the inner propagation light encounters any one of the micro-reflectors, being inner-inputted into the corresponding micro-reflectors, respectively. The inner-inputted inner propagation light is deflected by the fore-mentioned effect (inner-reflections effected mainly twice) as to be emitted from the emission face 15A toward a generally frontal direction.

Figure 3B:
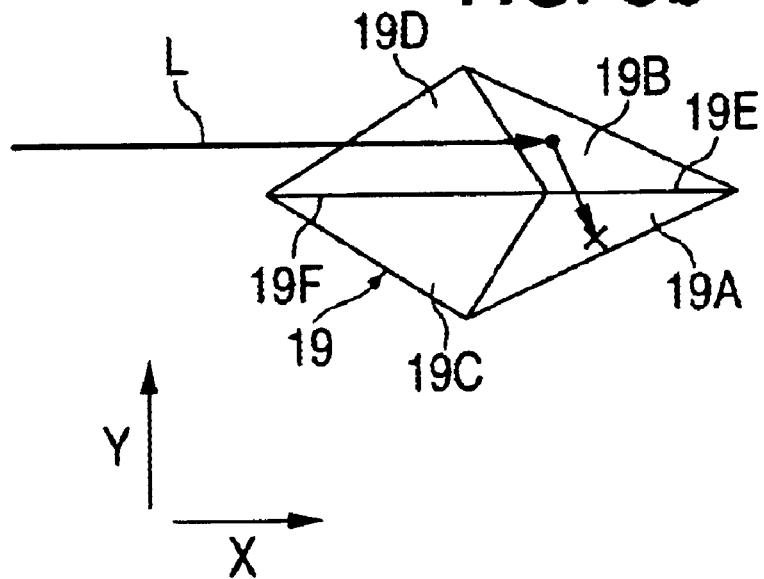

FIG. 3a and FIG. 3b are a side view and plan view of a micro-reflector formed on a back face of the light guide plate employed in the first embodiment, being accompanied with representative light paths, respectively.

As illustrated therein, a micro-reflector 10 has a pair of slopes 19A and 19B, which cause an illumination light L travelling within the light guide plate 15 to be emitted to a generally frontal direction with respect to the emission face 15A mainly through double reflections, and another pair of slopes 19C and 19D which are formed as to avoid the illumination light L approaching the slopes 19A and 19B from being blocked.

These two pairs of slopes are connected to each other, providing a quadrangle-pyramid-like projection from the back face 15B. The slopes 19A and 19B are inclined as to meet each other and make a designed vertical angle and a ridge 19E.

Viewing from the standpoint of the inside of the light guide plate 15, the micro-reflector 19 provides a valley having a bottom corresponding to the ridge 15E.

The slopes 19A and 19B are formed face-symmetrically with respect to a plane which passes a ridge 19E and is perpendicular to the emission face 15A, making the valley get shallower along the ridge 19E. In other words, the ridge 19E gets closer gradually to the back face 15B (a foot level of the micro-reflectors) with an increasing distance from the incidence face 15A.

As illustrated, an illumination light L, which approaches the valley from directions with a certain angular range with respect to the ridge 19E's direction as viewed from the back face 15B side, is inner-reflected by one 19A (or 19B) of the slopes and then by the other 19B (or 19A). As a result, an emission toward a generally frontal direction is generated.

On the other hand, the slopes 19C and 19D have flat surfaces, respectively, and meet each other as to form a ridge 19F like that formed by the slopes 19A and 19B. The slopes 19C and 19D are formed face-symmetrically with respect to a plane which passes a ridge 19F and is perpendicular to the emission face 15A. Projections of the ridges 19E and 19F give an arrangement like a straight-line. These slopes 19C and 19D not only avoid an inner-incidence to the slopes 19A from being blocked an 19B but also reflects some light at the slope 19C or 19D as to guide the light to the slope 19A or 19B at a preferable angle.

As described above, each micro-reflector 19 shows a good performance when the ridge 19E has an extending direction generally according with a light approaching direction and orientated as to get closer to the back face along the light approaching direction. Therefore, an orientation of a micro-reflector 19 can be represented by a ridge 19E.

In the next plane, described is how determine orientations of a great number of micro-reflectors 19 with referring to FIG. 1. As shown in FIG. 1, the back face 15B of the light guide plate 15 is divided, along an arrangement direction of the LEDs 14A, 14B and 14C, into three regions ARA, ARB and ARC generally equal to one another.

This division is designed so that each of the LEDs 14A to 14C is located at a generally center of each side corresponding to an end side of each region (a part of the incidence face 15C).

This an input portion corresponding to the LED 14A is allotted to the region ARA and another input portion corresponding to the LED 14B is allotted to the region ARB. Further, still another input portion corresponding to the LED 14C is allotted to the region ARC.

According to this, each micro-reflector 19 in the region ARA is orientated as to be directed to the input portion corresponding to the LED 14A. In other words, a ridge 19E of each micro-reflector 19 extends in a direction directed to the input portion corresponding to the LED 14A and gets closer to the back face 15B with an increasing distance from this input portion. In still other words, micro-reflectors 19 in the region ARA are orientated so that their valleys get shallower with an increasing distance from this input portion.

In the same way, micro-reflectors 19 in the region ARB are orientated as to be directed to the input portion corresponding to the LED 14B and micro-reflectors 19 in the region ARC are orientated as to be directed to the input portion corresponding to the LED 14C.

Studying the above division, it is understood that the above three regions ARA, ARB and ARC are determined under considering which of the three input portions (LEDs 14A, 14B and 14C) supplies light the most to each region ARA, ARB and ARC. Roughly saying, micro-reflectors 19 in the region ARA are apt to receive a light supply from the LED 14A.

In the same manner, it can be said that micro-reflectors 19 in the region ARB are apt to receive a light supply the most from the LED 14B and micro-reflectors 19 in the region ARC are apt to receive a light supply the most from the LED 14C.

Therefore it can be said that an approximately optimum orientation of the micro-reflectors 19 is realized in the regions ARA, ARB and ARC. At least, it is doubtless that an emission promotion supported by more effective direction-conversion is realized as compared with the case of the forementioned arrangement (FIG. 12).

Accordingly, if a smaller number of micro-reflectors 19 as compared with prior arts are formed, a surface light source device can maintain brightness. This enables a molding process to use an economical mold. Further, it is avoided that a strong light is incident to the micro-reflectors at large angles with respect to the orientation directions of the micro-reflectors, thereby preventing an inner propagation light from being affected at emission.

It is noted that sizes of the micro-reflectors are small enough to be hardly visible. The micro-reflectors may have one size. Covering rate (area occupied by micro-reflectors per unit area) of the micro-reflectors 19 is designed as to increase with an increasing distance from each corresponding input portion and an increasing inclination with respect to the frontal directions of the LEDs 14A to 14C, respectively.

This prevents brightness (emission intensity) on the emission face 15A from varying depending on position It is noted that "covering rate" is defined as area occupied by micro-reflectors per unit area.

Summarized operation of the first embodiment is as follows.

On switching on of LEDs 14A to 14C, each LED 14A to 14C emits light which is introduced into the light guide plate 15 through each corresponding input portion (a part of the incidence face 15C).

A great part of light from the LED 14A travels mainly within the region ARA. In the same manner, a great part of light from the LED 14B travels mainly within the region ARB and a great part of light from the LED 14C travels mainly within the region ARC.

According to such allotting, micro-reflectors in each region ARA, ARB or ARC accept mainly each light from each corresponding LED 14A, 14B or 14C into the corresponding valleys to produce effectively light directed to the emission face 15A.

As a result, emission toward a generally frontal direction of the emission face 15A is promoted. Emitted light from the emission face 15A is incident to the LCD panel 12 at a generally vertical angle after being scattered weakly by the light diffusion sheet 17. The LCD panel provides an image according to a well-known principle.

(2) Second Embodiment

FIG. 4 is a plan view illustrating, in the same manner as FIG. 1, a back face of light guide plate employed in a surface light source device applied to a liquid crystal display of the second embodiment in accordance with the present invention. This embodiment is not different from the first embodiment in structure an function except that a light guide plate 25 is employed instead of the light guide plate 15 (FIG. 1). Accordingly longwinded and repeated description is omitted.

The light guide plate 25 has a back face 25B that is featured by an micro-reflector arrangement different from that of the back face 15B of the light guide plate 16. Except this, the light guide plates 15 and 25 are not different. Accordingly, the following description is generally focused on the micro-reflector arrangement of the back face 25.

The second embodiment is an embodiment such that the first embodiment (light guide plate 15) is further improved. That is, forementioned division (ARA to ARC) tends to cause characteristics of the emission to show a sharp changing around a boundary between the region ARA and the region ARB adjacent to the region ARA. It is found that this is apt to bring an unnatural emission around the boundary depending on viewing angles.

Further, if the LEDs 14A to 14C are different in emission intensity, the regions ARA to ARC have differences among them in brightness and it is found that the differences are easily observed, because each of the LEDs 14A to 14C carries out light supplying to each of the regions ARA to ARC independently.

Thus the second embodiment somewhat relaxes the above independent allotting relation between the regions and the input portion to suppress the above problem.

As shown in FIG. 4, the input portions are arranged in the same manner as compared with the first embodiment. That is, an end face of the light guide plate 25 provides an incidence face 25C along which LEDs 14A to 14C are disposed at three locations with a generally constant interval. Corresponding to each input portion (each of the LED 14A to 14C) the regions ARA, ARB and ARC are set.

To give a consideration to each inner propagation light coming from each of the LEDs 14A to 14C, let divide the region ARA into upper and lower regions ARA1 and ARA2 with respect to a just frontal direction of the LED 14A.

First, in the region ARA1, the LED 14A allotted to the region ARA supplies a straightly-travelling inner propagation light the most and, less than the most, the LED 14B allotted to the region ARB adjacent to the region ARB supplies much straightly-travelling inner propagation light.

Therefore the second embodiment much of the micro-reflectors in the region ARA1 are orientated as to be directed to the LED 14A while the rest micro-reflectors in the region ARA1 are orientated as to be directed to the LED 14B allotted to the region ARB adjacent thereto.

The latter group of micro-reflectors 19 are arranged by black painting in FIG. 4. And the micro-reflectors in the subsidiary region ARA1 are arranged so that the latter group of micro-reflectors (directed to LED 14B) have a covering rate (number density if this case) the ratio of which to that of the former group of micro-reflectors gets greater with an decreasing distance from the area ARB.

On the other hand, in the region ARA2, the LED 14A allotted to the region ARA supplies a straightly-travelling inner propagation light the most and, less than the most, the LED 14A supplies much propagation light reflected by a side face 25D.

Therefore some micro-reflectors intermingled with ones directed to the LED 14A in the region ARA2 are directed to an imaginary image position of the LED 14A produced by the side face 25D. These intermingled ones are expressed by vertical hatching in FIG. 4. The micro-reflectors in the region ARA2 are orientated so that degree of intermingling gets greater with an decreasing distance from the side face 25D.

In the next place, to give a consideration to the inner propagation light, let divide the central region ARB into two subsidiary regions ARB1 and ARB2 with respect to a just frontal direction of the LED 14B.

In the region ARB1, the LED 14B allotted to the region ARB supplies a straightly-travelling inner propagation light the most and, less than the most, the LED 14C for the region ARC adjacent thereto supplies much straightly-travelling inner propagation light.

Therefore micro-reflector 19 directed to the LED 14C allotted to the adjacent region ARC are intermingled with ones directed to the LED 14B in the region ARB1.

These intermingled ones are expressed by traversing hatching in FIG. 4. The micro-reflectors in the subsidiary region ARB1 are orientated so that degree of intermingling gets greater with an decreasing distance from the region ARC.

In the subsidiary region ARB2, the LED 14B allotted to the region ARB supplies a straightly-travelling inner propagation light the most and, less than the most, the LED 14A allotted to the region ARA supplies much straightly-travelling inner propagation light.

Therefore some micro-reflectors intermingled with ones directed to the LED 14B in the subsidiary region ARB2 are directed to the LED 14A. These intermingled ones are expressed by vertical hatching in FIG. 4.

The micro-reflectors in the subsidiary region ARB2 are orientated so the degree of intermingling gets greater with an decreasing distance from the region ARA.

In a similar way, the region ARC consists of upper and lower subsidiary regions ARC1 and ARC2, in each of which micro-reflectors 19 directed differently are intermingled so that degree of intermingling gets greater with an decreasing distance from a side face or the region ARB.

In a case of design, concrete method is as follows. This method adopts an idea of main arrangement pattern and subsidiary arrangement pattern. The main arrangement pattern is set as to be equivalent to the micro-reflector arrangement according to the arrangement rule employed in the first embodiment (FIG. 1).

Figure 5:
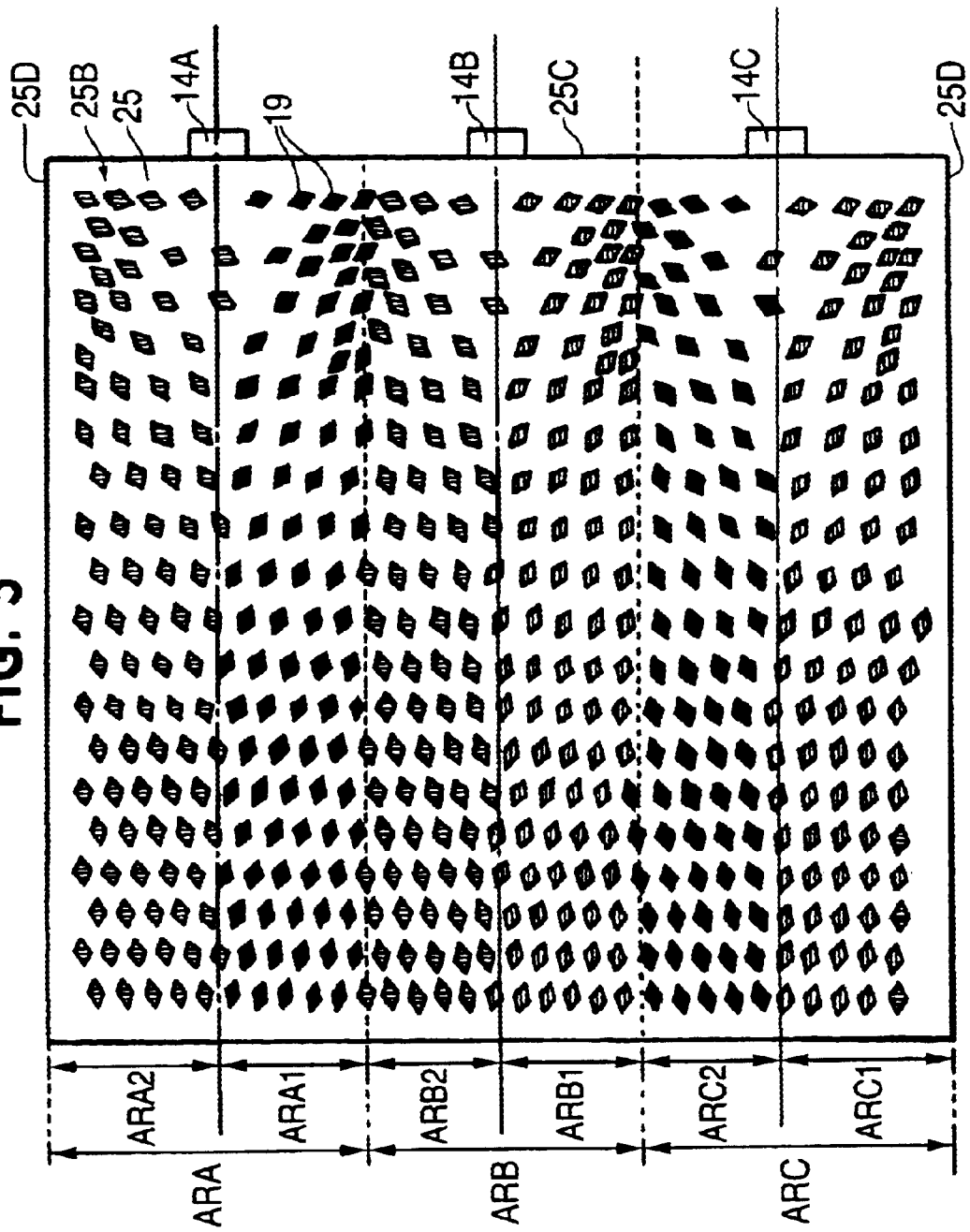
FIG. 5 is a plan view illustrating a subsidiary arraying pattern which is applied to the arrangement of the micro-reflectors formed on the light guide plate shown in FIG. 4.

In the next place, determined is an arrangement pattern for micro-reflectors directed to a LED for an adjacent region or to an imaginary image focusing position of a LED produced by the side face 25D, for example as shown in FIG. 5.

This is called subsidiary arrangement pattern. Some micro-reflectors 19 according to the main arrangement pattern are replaced by ones according to subsidiary arrangement pattern in proportion to the degree of intermingling (degree of modification of main arrangement pattern). An example of an obtained micro-reflector arrangement is shown in FIG. 4.

It is noted that the arrangement shown in FIG. 4 the degree (ratio) of intermingling is previously defined as a function of position and random number processing is applied to the function, thereby modifying the main arrangement pattern by means of the subsidiary arrangement pattern to cause micro-reflectors are intermingled with an irregularity.

Thus this embodiment avoids characteristics of the emission from showing a sharp changing around the boundaries among the regions ARA to ARC. As a result, the boundaries are not conspicuous.

Beside, even if the LEDs 14A to 14C are different in emission intensity, the regions ARA to ARC have differences which are not conspicuous.

It is noted that replacement of a main arrangement pattern by a subsidiary arrangement pattern around the boundaries among the regions ARA to ARC in this embodiment may be determined depending which of a LED allotted to the region to which the micro-reflector to be orientation-determined belongs and another LED allotted to another region adjacent to the foresaid region. However, even if a micro-reflector is closer to the latter LED, replacement is not always carried out.

That is, in the first place, an irregularity is obtained by using parameters expressing factors such as relative positions with the LEDs and applying random number processing.

And then the proportion whether each actual stop of replacement from main arrangement pattern to subsidiary arrangement pattern for each micro-reflector to be orientation-determined is carried out or not is adjusted under consideration to a possibility factor that is determined as to be greater with a decreasing distance from the LED allotted to the adjacent region.

(3) Other Embodiments

The above-described embodiments do not limit the scope of the present invention at all. For example, the following modifications are allowed without deviating from the scope of the present invention.

(a) Micro-reflectors may be shaped without a particular limitation so far as their function is maintained, namely, so far as an inner propagation light directed an emission face is produced by an inner reflection. Typical micro-reflector shapes other than like quadrangle pyramid as described in the above embodiments include shapes such as like a cylindrical concave or a V-shaped concave (lying triangle column recess).

Light direction-conversion ways of an inner propagation light in these modifications are briefly described with referring to FIGS. 9a to 9d and FIGS. 10a to 10d.

In the first place, referring to FIGS. 9a to 9d, a light guide plate 40 has a back face 42 provided with a great number of micro-reflectors 60 shaped like cylindrical concaves. An inner proportion light is represented by a beam P.

It is noted that coordinate system O-XYZ is used for the sake of expressing directions. In this case, Y-axis corresponds to a main light coming direction and Z-axis corresponds to a direction perpendicular to an emission face. The representing beam P is depicted in FIGS. 9b to 9d as viewed from directions of +Z, +X and +Y, respectively.

As shown in FIG. 9a and others, the inner propagation light P reaches a cylindrical surface (inner reflection curved surface) on the nearer side of a micro-reflector 60 directly from an incidence face 48 or indirectly after undergoing an inner reflection at an emission face 41 or back face 42. A large part of the light reaching the cylindrical surface is inner reflected, becoming an inner propagation light directed to the emission face 41.

This light becomes then an output light Q of the light guide plate 40 after being emitted from the emission face 41. Such behavior of light will be understood well from FIGS. 9b to 9d illustrating the light path as viewed from three directions, respectively.

Orientation and arrangement of the micro-reflectors 60 are similar to those of the above embodiments (FIG. 1 or 4) although the micro reflectors shaped differently. It should be noted that an orientation of a micro-reflector is represented by a direction to which the cylindrical surface effecting inner reflection is directed (i.e. a direction perpendicular to a bottom line of the cylinder-like concave).

If the micro-reflectors 19 in any of the above first and second embodiments are replaced by such micro-reflectors 60, the micro-reflectors 60 perform direction conversion in a similar manner as compared with the micro-reflectors 19. Therefore, it will be understood without more detailed discussion that an effective illumination output is obtained according to an effect like those of the first or second embodiment.

In the next place, referring to FIGS. 10a to 10d, a light guide plate 50 has a back face 52 provided with a great number of micro-reflectors 70 shaped like V-shaped concaves. An inner propagation light is represented by a beam P. It is noted that Y-axis corresponds to a main light coming direction and Z-axis corresponds to a direction perpendicular to an emission face. The representing beam P is depicted in FIGS. 1b to 10d as viewed from directions of +Z, +X and +Y, respectively As shown in FIG. 10a and others, the inner propagation light P reaches a V-shaped slope (inner reflection slope) on the nearer side of a micro-reflector 70 directly from an incidence face 53 or indirectly after undergoing an inner reflection at an emission face 51 or back face 52.

A large part of the light reaching this V-shaped slope is inner-reflected, becoming an inner propagation light directed to the emission face 41. This light becomes then an output light Q of the light guide plate 50 after being emitted from the emission face 51. Such behavior of light will be understood well from FIGS. 10b to 10d illustrating the light path as viewed from three directions, respectively.

Orientation and arrangement of the micro-reflectors 70 are similar to those of the above embodiments (FIG. 1 or 4) although the micro-reflectors shaped differently. It should be noted that an orientation of a micro-reflector is represented by a direction to which the V-shaped slope effecting inner reflection is directed (i.e. a direction perpendicular to a bottom line of the V-shaped concave).

If the micro-reflectors 19 in any of the above first and second embodiments are replaced by such micro-reflectors 60, the micro reflectors 60 perform direction conversion in a similar manner as compared with the micro-reflectors 19. Therefore, it will be understood without more detailed discussion that an effective illumination output is obtained according to an effect like those of the first or second embodiment.

(b) In the above embodiments, the back face is divided into three regions ARA, ARB and ABC parallel and generally equal to one another, to each of which an input portion having a point-like light source is allotted. However, this does not limit the scope of the present invention. For instance, the back face may be divided into two, four or more regions to each of which an input portion is allotted.

Figure 6:
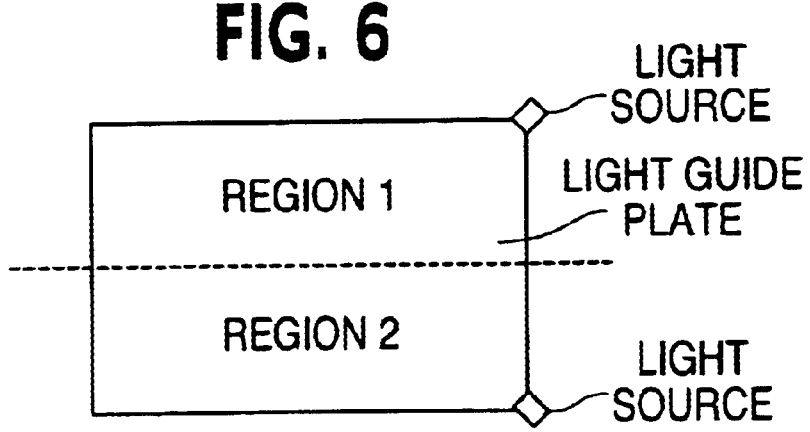
FIG. 6 is a plan view illustrating an arrangement of a light guide plate and a primary light source employed in another embodiment in accordance with the present invention.
Figure 7:
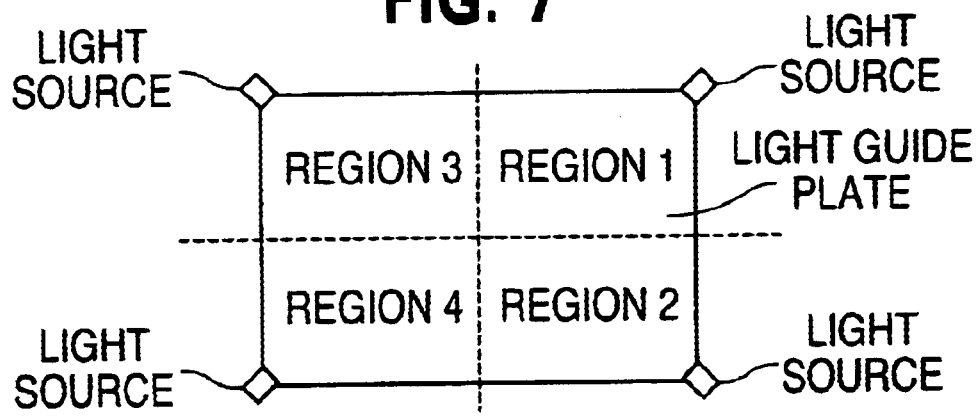
FIG. 7 is a plan view illustrating an arrangement of a light guide plate and a primary light source employed in still another embodiment in accordance with the present invention.
Figure 8:
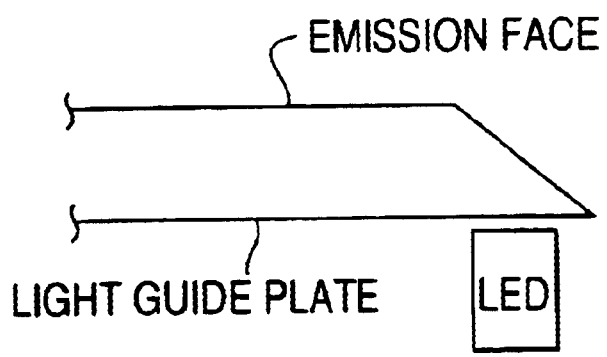
FIG. 8 is a partial cross section view illustrating a light guide plate having a back face a part of which provides an incidence face.
Figure 11:
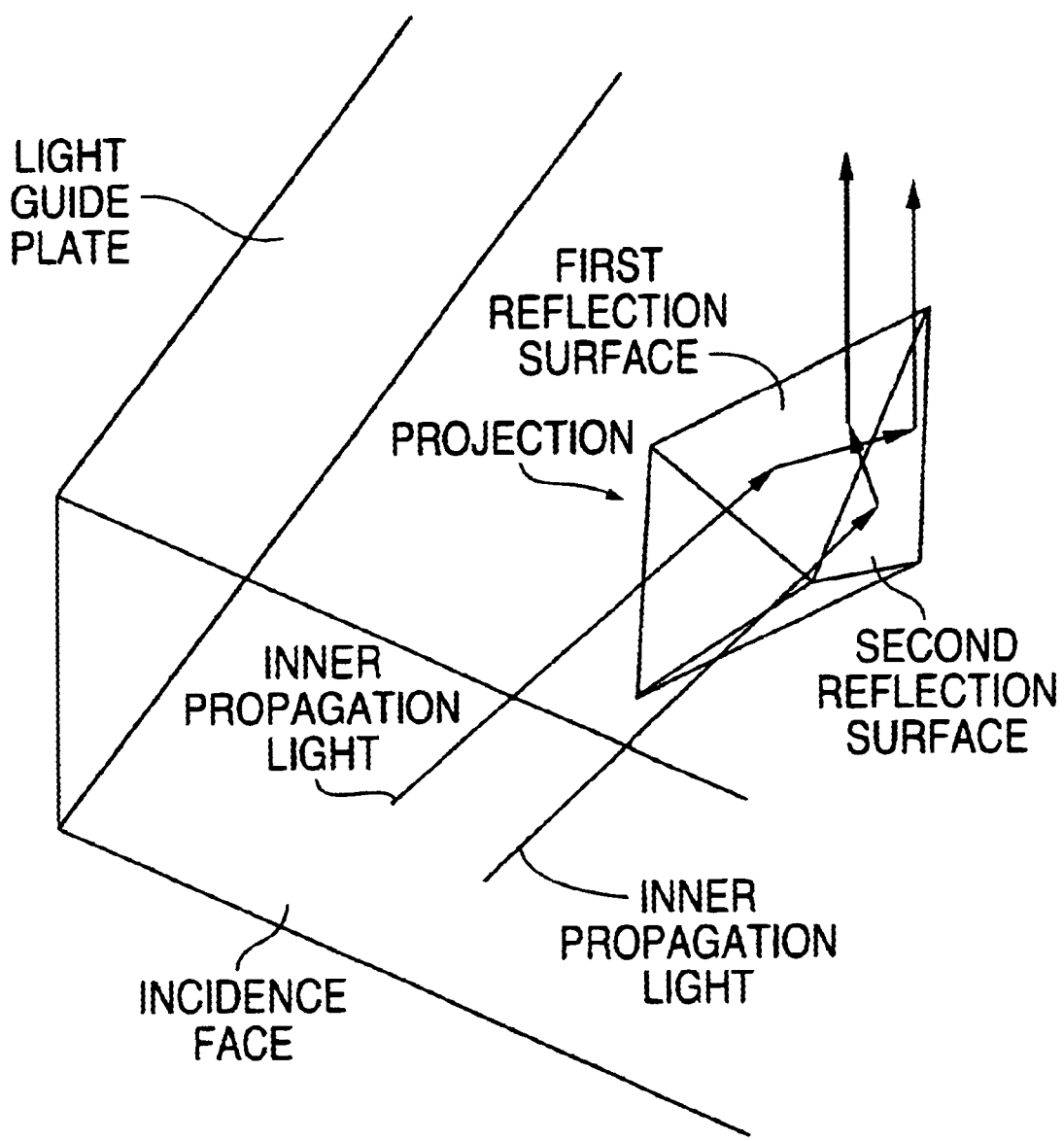
FIG. 11 is a perspective view illustrating a micro-reflector which was proposed in Japanese Patent Application Tukugan-Hei 11-38977.

(c) Although the above embodiments arrange point-like light sources at a side face, such an arrangement does not limit the scope of the present invention. For instance, cut-off configurations may be prepared at corners at which point-like light sources are arranged to provide input portions, respectively, as shown in FIGS. 6 and 7. Alternatively, oblique cut-off configurations may be prepared at corners or a side face in the vicinity of which point-like light sources are arranged at the back face side or the emission face side to provide input portions, respectively, as shown in FIG. 6.

(d) Shape-modified quadrangle pyramid-like micro-reflectors may be employed. That is, differently shaped projection configurations are employable so far as they are capable or direction-conversion mainly based on double inner-reflections at their slopes and incidences to the slopes for inner-reflections are not blocked.

A pair of slopes of each micro-reflector need not always to be connected directly to each other. A pair of slopes may be connected to each other with a curved face interposed between them so far as a practically enough performance is realized. Alternatively, a pair of slopes themselves may consists of curved surfaces. In these cases, as viewed from the emission face side, each top line of the curved surfaces forms a ridge representing an orientation of a micro-reflector.

(e) In the above embodiments, a uniformalized emission intensity is provided by adjusting number of micro-reflectors. The present invention allows other means to be employed, for obtaining a uniformalized emission distribution, instead of or in addition to such an number adjustment, for example, size-adjustment or shape-adjustment.

(f) In the above embodiments, each light guide plate has a uniform thickness. However, this does not limit the scope of the present invention. For example, a light guide plate having a wedge-like cross section.

(g) The above embodiments are described as they are applied to a portable telephone. However, this does not limit the scope of the present invention, allowing applications to various appliances which require a surface-like illumination.

(h) Various techniques related to a field of surface light source device and display may be applied, unless they spoil features of the present invention, or in order to enforcing effects of the present invention.

As described above, the present invention provides a light guide plate suitable for an arrangement which introduces light from a plurality of input portions using point-like light sources, and a surface light source device and a display employing the light guide plate.

Further, the present invention provides a light guide plate and a surface light source device which are capable of outputting an illumination light at a high efficiency and to realize a bright display by applying them to a display, if a primary light comprising a plurality of point-like light sources is employed.

What is claimed is:

1. A light guide plate having a plurality of input portions through which an illumination light emitted from a point-like light source is introduced and an emission face provided by a major face through which the illumination light introduced is emitted on the way of inner propagation, wherein said light guide plate has a back face opposite with said emission face and divided into a plurality of regions to each of which any of said input portions is allotted, each of said regions being provided with a great number of micro-reflectors for converting a direction of an inner propagation light into a direction toward said emission face by effecting an inner reflection, said micro-reflectors located in each of said regions being orientated toward an input portion allotted to said each region.

2. A light guide plate according to claim 1, wherein each of said micro-reflectors is shaped like a quadrangle pyramid having a pair of inner-reflection slopes which meet each other as to provide a ridge representing an orientation of said each micro-reflector, said ridge being directed toward said input portion allotted and getting closer to said back face with an increasing distance from said input portion allotted.

3. A light guide plate according to claim 1, wherein each of said micro-reflectors is shaped like a cylindrical concavity having an inner-reflection curved surface which represents an orientation of said each micro-reflector, said inner-reflection curved surface being directed toward said input portion allotted.

4. A light guide plate according to claim 1, wherein each of said micro-reflectors is shaped like a V-shaped concavity having an inner-reflection slope which represents an orientation of said each micro-reflector, said inner-reflection slope being directed toward said input portion allotted.

5. A light guide plate having a plurality of input portions through which an illumination light emitted from a point-like light source is introduced and an emission face provided by a major face through which the illumination light introduced is emitted on the way of inner propagation, wherein said light guide plate has a back face opposite with said emission face and divided into a plurality of regions to each of which any of said input portions is allotted, each of said regions being provided with a great number of micro-reflectors including a first group of micro-reflectors orientated toward an input portion allotted to said each region and a second group of micro-reflectors which are intermingled with said first group of micro-reflectors and orientated toward another input portion allotted to different region adjacent to said each region, and said second group of micro-reflectors having a covering rate the ratio of which to that of said first group of micro-reflectors gets greater with an decreasing distance from said adjacent region.

6. A light guide plate according to claim 5, wherein each of said micro-reflectors is shaped like a quadrangle pyramid having a pair of inner-reflection slopes which meet each other as to provide a ridge representing an orientation of said each micro-reflector, said ridge of each of said first group of micro-reflectors being directed toward said input portion allotted and getting closer to said back face with an increasing distance from said input portion allotted, said ridge of each of said second group of micro-reflectors being directed toward said another input portion and getting closer to said back face with an increasing distance from said another input portion.

7. A light guide plate according to claim 5, wherein each of said micro-reflectors is shaped like a cylindrical concavity having an inner-reflection curved surface which represents an orientation of said each micro-reflector, said inner-reflection curved surface of each of said first group of micro-reflectors being directed toward said input portion allotted, said inner-reflection curved surface of each of said second group of micro-reflectors being directed toward said another input portion.

8. A light guide plate according to claim 5, wherein each of said micro-reflectors is shaped like a V-shaped concavity having an inner-reflection slope which represents an orientation of said each micro-reflector, said inner-reflection slope of each of said first group of micro-reflectors being directed toward said input portion allotted, said inner-reflection slope of each of said second group of micro-reflectors being directed toward said another input portion.

9. A surface light source device comprising:
a light guide plate according to any one of claims 1 to 4; and
point like light sources arranged corresponding to said input portions of said light guide plate respectively.

10. A surface light source device comprising:
a light guide plate according to any one of claims 5 to 8; and
point like light sources arranged corresponding to said input portions of said light guide plate respectively.

11. A display having a liquid crystal display panel and a surface light source device for illuminating said liquid crystal display panel, wherein said surface light source device comprises a light guide plate according to any one of claims 1 to 4 and a point like light sources arranged corresponding to said input portions of said light guide plate respectively.

12. A display having a liquid crystal display panel and a surface light source device for illuminating said liquid crystal display panel, wherein said surface light source device comprises a light guide plate according to any one of claims 5 to 8 and a point like light sources arranged corresponding to said input portions of said light guide plate respectively.

* * * * *